(12) United States Patent
Fu et al.

(10) Patent No.: US 10,887,677 B2
(45) Date of Patent: Jan. 5, 2021

(54) OPTICAL RECEIVER

(71) Applicant: HUAWEI TECHNOLOGIES CO., LTD., Guangdong (CN)

(72) Inventors: Shengmeng Fu, Wuhan (CN); Yu Xiong, Wuhan (CN); Jiangwei Man, Wuhan (CN); Chengyan Wang, Wuhan (CN); Xiaofei Zeng, Dongguan (CN); Li Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/520,029

(22) Filed: Jul. 23, 2019

(65) Prior Publication Data

US 2019/0349655 A1 Nov. 14, 2019

Related U.S. Application Data

(63) Continuation of application No. PCT/CN2017/072513, filed on Jan. 24, 2017.

(51) Int. Cl.
*H04Q 11/00* (2006.01)
*H04B 10/69* (2013.01)

(52) U.S. Cl.
CPC ..... *H04Q 11/0067* (2013.01); *H04B 10/6931* (2013.01); *H04Q 11/0071* (2013.01)

(58) Field of Classification Search
CPC ........... H04B 10/6931; H04Q 11/0067; H04Q 11/0071
See application file for complete search history.

(56) References Cited

U.S. PATENT DOCUMENTS 9,354,113 B1 * 5/2016 Hayat ................. H04B 10/693
2005/0191059 A1 9/2005 Swenson et al.
(Continued)

FOREIGN PATENT DOCUMENTS

CN 101145851 A 3/2008
CN 201571058 U 9/2010
(Continued)

OTHER PUBLICATIONS

Extended European Search Report issued in European Application No. 17894304.9 dated Dec. 3, 2019, 6 pages.
(Continued)

*Primary Examiner* — Dzung D Tran
(74) *Attorney, Agent, or Firm* — Fish & Richardson P.C.

(57) ABSTRACT

The present disclosure relates to optical receivers. One example optical receiver includes an optoelectronic detector, a transimpedance amplification (TIA) circuit, a single-ended-to-differential converter, an I/O interface, and a controller. The optoelectronic detector, having bandwidth lower than required system transmission bandwidth, converts an optical signal into a current signal. The TIA circuit compensates gain for the received current signal based on a received control signal to obtain a voltage signal, where a frequency response value of the current signal within first bandwidth is greater than that within the bandwidth of the optoelectronic detector, and any frequency in the first bandwidth is not lower than an upper cut-off frequency of the optoelectronic detector. The single-ended-to-differential converter converts the voltage signal into a differential voltage signal. The I/O interface outputs the differential voltage signal. The controller generates the control signal based on the differential voltage signal.

16 Claims, 5 Drawing Sheets

(56) References Cited

U.S. PATENT DOCUMENTS

| | | | |
|---|---|---|---|
| 2006/0115280 A1 | 6/2006 | Chang et al. | |
| 2009/0315626 A1 | 12/2009 | Bowler et al. | |
| 2012/0141122 A1 | 6/2012 | Carusone et al. | |
| 2013/0108278 A1* | 5/2013 | Azadeh | H04B 10/695 398/202 |
| 2016/0301480 A1* | 10/2016 | Ide | H04B 10/801 |
| 2016/0365930 A1* | 12/2016 | Seo | H04B 10/6932 |

FOREIGN PATENT DOCUMENTS

| | | |
|---|---|---|
| CN | 102332951 A | 1/2012 |
| CN | 102420649 A | 4/2012 |
| CN | 103840888 A | 6/2014 |
| CN | 103929139 A | 7/2014 |
| CN | 105897207 A | 8/2016 |
| CN | 106535010 A | 3/2017 |
| DE | 102005038894 A1 | 6/2006 |
| EP | 2736182 A1 | 5/2014 |
| JP | 2013090128 A | 5/2013 |
| JP | 2014135646 A | 7/2014 |

OTHER PUBLICATIONS

PCT International Search Report and Written Opinion in International Application No. PCT/CN2017/072,513, dated Oct. 20, 2017, 18 pages (With English Translation).

Derr, "Coherent Optical QPSK Intradyne System: Concept and Digital Receiver Realization," Journal of Lightwave Technology, vol. 10, No. 9, Sep. 1992, 7 pages.

Office Action issued in Chinese Application No. 201780083389.2 dated Jun. 8, 2020, 8 pages.

Jung et al., "A High-Speed CMOS Integrated Optical Receiver With an Under-Damped TIA," IEEE Photonics Technology Letters, vol. 27, No. 13, Jul. 1, 2015, 4 pages.

Office Action issued in Japanese Application No. 2019-539951 dated Oct. 27, 2020, 8 pages (with English translation).

* cited by examiner

OPTICAL RECEIVER

CROSS-REFERENCE TO RELATED APPLICATIONS

This application is a continuation of International Application No. PCT/CN2017/072513, filed on Jan. 24, 2017. The disclosure of the aforementioned application is hereby incorporated by reference in its entirety.

TECHNICAL FIELD

This application relates to the optical communications field, and in particular, to an optical receiver having a high-frequency peak gain.

BACKGROUND 10G passive optical network (PON) technologies and products have been ready and enter a large-scale deployment stage. In a 10G PON, costs of an optical network unit (ONU) become a key problem in massive deployment in the future, and costs reduction is a key requirement of the 10G PON. A bi-directional optical sub-assembly on board (BOB) technology that is widely used in a gigabit passive optical network (GPON) can also be used in the 10G PON, to reduce packaging costs. Therefore, component costs reduction is key to further costs reduction.

In the ONU of the 10G PON, a 10G avalanche photodiode (APD) is a highest-rate optical component, and accounts for a largest proportion of costs. Therefore, reduction of costs of the APD is key to reduction of the costs of the ONU of the 10G PON.

SUMMARY

Embodiments of this application provide an optical receiver, to receive a high-rate signal by using a low-rate APD, thereby resolving a problem that costs of an overall component are excessively high due to excessively high costs of a high-rate APD.

According to a first aspect, an optical receiver is provided, including an optoelectronic detector, a transimpedance amplification circuit, a single-ended-to-differential converter, an I/O interface, and a controller, where the optoelectronic detector is configured to convert a received optical signal into a current signal, where bandwidth of the optoelectronic detector is lower than a system transmission bandwidth requirement; the transimpedance amplification circuit is configured to: receive the current signal and a first control signal, and perform transimpedance gain on the current signal based on the first control signal, to obtain a voltage signal, where a frequency response value of the current signal within first bandwidth is greater than that within the bandwidth of the optoelectronic detector, and any frequency in the first bandwidth is not lower than an upper cut-off frequency of the optoelectronic detector; the single-ended-to-differential converter is configured to: convert the voltage signal into a differential voltage signal, and send the differential voltage signal to the I/O interface and the controller; the I/O interface is configured to output the differential voltage signal; and the controller is configured to: generate a second control signal based on the differential voltage signal, and send the second control signal to the transimpedance amplification circuit, where the second control signal is used to control the transimpedance amplification circuit to perform transimpedance gain on the current signal.

According to the optical receiver provided in this embodiment of this application, the optoelectronic detector whose bandwidth is lower than the system transmission bandwidth requirement is used, to greatly reduce costs of the optical receiver; and the transimpedance amplification circuit is used, to remedy received signal deterioration caused by bandwidth insufficiency, so that component costs are reduced while received signal quality is ensured.

With reference to the first aspect, in a first possible implementation of the first aspect, the controller is specifically configured to: perform a plurality of times of sampling processing, and perform the following process in each time of sampling processing: sending a control signal to the transimpedance amplification circuit; sampling an upper level and a lower level of the received differential voltage signal, to obtain a value of a sampling point; and modifying the control signal based on a preset modification amount; and after performing the plurality of times of sampling processing, the controller is specifically configured to use, as the second control signal, a control signal corresponding to a sampling point with a maximum value in a plurality of sampling points obtained after the plurality of times of sampling processing.

With reference to the first aspect, in a second possible implementation of the first aspect, the controller is specifically configured to: perform a plurality of times of detection processing, and perform the following process in each time of detection processing: sending a control signal to the transimpedance amplification circuit; using a first frequency as a boundary, and separately detecting energy of the differential voltage signal that is higher than the first frequency and energy of the differential voltage signal that is lower than the first frequency, to obtain an energy difference, where the first frequency is 0.28/Tb, and Tb is duration of each bit of the differential voltage signal; and modifying the control signal based on a preset modification amount; and after performing the plurality of times of detection processing, the controller is specifically configured to use, as the second control signal, a control signal corresponding to a minimum energy difference in a plurality of energy differences obtained after the plurality of times of detection processing.

The foregoing two embodiments are two implementations in which the controller selects an optimal control signal. The optimal control signal can enable the transimpedance amplification circuit to perform, for the optoelectronic detector, optimal compensation that can be implemented by the transimpedance amplification circuit. Further, gain compensation by the transimpedance amplification circuit is implemented inside the transimpedance amplification circuit, so that no additional noise is introduced.

With reference to the first aspect, in a third possible implementation of the first aspect, the optical receiver further includes an equalizer, where the equalizer is configured to: receive the differential voltage signal and a third control signal, perform gain on the differential voltage signal based on the third control signal, and send a differential voltage signal obtained after the gain to the controller and the I/O interface, where a frequency response value of the differential voltage signal within second bandwidth is greater than that within the first bandwidth, and any frequency in the second bandwidth is higher than any frequency in the first bandwidth; and the controller is further configured to: generate a fourth control signal based on the differential voltage signal, and send the fourth control signal to the equalizer, where the fourth control signal is used to control the equalizer to perform gain on the differential voltage signal.

In this embodiment of this application, the equalizer is used, so that a range of compensation for the optoelectronic detector is extended, and gain compensation can be performed for a higher frequency compared with the transimpedance amplification circuit.

With reference to the third possible implementation of the first aspect, in a fourth possible implementation of the first aspect, the controller is specifically configured to: perform a plurality of times of first sampling processing, and perform the following process in each time of first sampling processing: sending a control signal to the transimpedance amplification circuit; sampling an upper level and a lower level of the received differential voltage signal, to obtain a value of a sampling point; and modifying the control signal based on a preset modification amount; and after performing the plurality of times of first sampling processing, the controller is specifically configured to use, as the second control signal, a control signal corresponding to a sampling point with a maximum value in a plurality of sampling points obtained after the plurality of times of first sampling processing; and after sending the second control signal to the transimpedance amplification circuit, the controller further performs a plurality of times of second sampling processing, and performs the following process in each time of second sampling processing: sending a control signal to the equalizer; sampling an upper level and a lower level of the received differential voltage signal, to obtain a value of a sampling point; and modifying the control signal based on the preset modification amount; and after performing the plurality of times of second sampling processing, the controller is specifically configured to use, as the fourth control signal, a control signal corresponding to a sampling point with a maximum value in a plurality of sampling points obtained after the plurality of times of second sampling processing.

With reference to the third possible implementation of the first aspect, in a fifth possible implementation of the first aspect, the controller is specifically configured to: perform a plurality of times of first detection processing, and perform the following process in each time of first detection processing: sending a control signal to the transimpedance amplification circuit; using a first frequency as a boundary, and separately detecting energy of the differential voltage signal that is higher than the first frequency and energy of the differential voltage signal that is lower than the first frequency, to obtain an energy difference, where the first frequency is 0.28/Tb, and Tb is duration of each bit of the differential voltage signal; and modifying the control signal based on a preset modification amount; and after performing the plurality of times of first detection processing, the controller is specifically configured to use, as the second control signal, a control signal corresponding to a minimum energy difference in a plurality of energy differences obtained after the plurality of times of first detection processing; and after sending the second control signal to the transimpedance amplification circuit, the controller further performs a plurality of times of second detection processing, and performs the following process in each time of second detection processing: sending a control signal to the equalizer; using the first frequency as a boundary, and separately detecting energy of the differential voltage signal that is higher than the first frequency and energy of the differential voltage signal that is lower than the first frequency, to obtain an energy difference, where the first frequency is 0.28/Tb, and Tb is duration of each bit of the differential voltage signal; and modifying the control signal based on the preset modification amount; and after performing the plurality of times of second detection processing, the controller is specifically configured to use, as the fourth control signal, a control signal corresponding to a minimum energy difference in a plurality of energy differences obtained after the plurality of times of second detection processing.

The foregoing two embodiments are two manners in which the controller selects an optimal control signal when the optical receiver includes the equalizer. The transimpedance amplification circuit is first used to perform gain compensation without introducing additional noise; and if gain compensation is not enough, the equalizer is then used to perform gain compensation, so that an optimal compensation effect is achieved at a minimum noise cost.

According to a second aspect, an optical receiver is provided, including an optoelectronic detector, a first transimpedance amplification circuit, a single-ended-to-differential converter, an equalizer, an I/O interface, and a controller, where the optoelectronic detector is configured to convert a received optical signal into a current signal, where bandwidth of the optoelectronic detector is lower than a system transmission bandwidth requirement; the first transimpedance amplification circuit is configured to: receive the current signal, and perform transimpedance gain on the current signal, to obtain a voltage signal; the single-ended-to-differential converter is configured to: convert the voltage signal into a differential voltage signal, and send the differential voltage signal to the equalizer; the equalizer is configured to: receive the differential voltage signal and a first control signal, perform gain on the differential voltage signal based on the first control signal, and send a differential voltage signal obtained after the gain to the I/O interface and the controller, where a frequency response value of the differential voltage signal within first bandwidth is greater than that within the bandwidth of the optoelectronic detector, and any frequency in the first bandwidth is higher than an upper cut-off frequency of the optoelectronic detector; the I/O interface is configured to output the differential voltage signal obtained after the gain; and the controller is configured to: generate a second control signal based on the differential voltage signal obtained after the gain, and send the second control signal to the equalizer, where the second control signal is used to control the equalizer to perform gain on the differential voltage signal.

In this embodiment of this application, the equalizer is used to implement gain compensation for a high frequency. According to a feature of a wide compensation range of the equalizer, the equalizer is enabled to perform compensation for the optoelectronic detector, to achieve an optimal effect. Compared with the embodiment provided in the first aspect, this embodiment has an advantage of a wider range of compensation for the optoelectronic detector, and has a disadvantage that more noise is introduced because gain compensation for the high frequency is completely implemented by the equalizer.

With reference to the second aspect, in a first possible implementation of the second aspect, the controller is specifically configured to: perform a plurality of times of sampling processing, and perform the following process in each time of sampling processing: sending a control signal to the equalizer; sampling an upper level and a lower level of the received differential voltage signal, to obtain a value of a sampling point; and modifying the control signal based on a preset modification amount; and after performing the plurality of times of sampling processing, the controller is specifically configured to use, as the second control signal, a control signal corresponding to a sampling point with a maximum value in a plurality of sampling points obtained after the plurality of times of sampling processing.

With reference to the second aspect, in a second possible implementation of the second aspect, the controller is specifically configured to: perform a plurality of times of detection processing, and perform the following process in each time of detection processing: sending a control signal to the equalizer; using a first frequency as a boundary, and separately detecting energy of the differential voltage signal that is higher than the first frequency and energy of the differential voltage signal that is lower than the first frequency, to obtain an energy difference, where the first frequency is 0.28/Tb, and Tb is duration of each bit of the differential voltage signal; and modifying the control signal based on a preset modification amount; and after performing the plurality of times of detection processing, the controller is specifically configured to use, as the second control signal, a control signal corresponding to a minimum energy difference in a plurality of energy differences obtained after the plurality of times of detection processing.

According to a third aspect, a receiving method is provided, including: converting, by an optical receiver, a received optical signal into a current signal by using an optoelectronic detector, where bandwidth of the optoelectronic detector is lower than a system transmission bandwidth requirement; performing, by the optical receiver, transimpedance gain on the current signal based on a first control signal, to obtain a voltage signal, where a frequency response value of the current signal within first bandwidth is greater than that within the bandwidth of the optoelectronic detector, and any frequency in the first bandwidth is not lower than an upper cut-off frequency of the optoelectronic detector; and converting, by the optical receiver, the voltage signal into a differential voltage signal, and generating a second control signal based on the differential voltage signal, where the second control signal is used to control the optical receiver to perform transimpedance gain on the current signal.

With reference to the third aspect, in a first possible implementation of the third aspect, the generating a second control signal based on the differential voltage signal specifically includes: performing a plurality of times of sampling processing, and using, as the second control signal, a control signal corresponding to a sampling point with a maximum value in a plurality of sampling points obtained after the plurality of times of sampling processing, where the following process is performed in each time of sampling processing: performing transimpedance gain on the current signal based on a control signal, to obtain the voltage signal, and converting the voltage signal into the differential voltage signal; sampling an upper level and a lower level of the differential voltage signal, to obtain a value of a sampling point; and modifying the control signal based on a preset modification amount.

With reference to the third aspect, in a second possible implementation of the third aspect, the generating a second control signal based on the differential voltage signal specifically includes: performing a plurality of times of detection processing, and using, as the second control signal, a control signal corresponding to a minimum energy difference in a plurality of energy differences obtained after the plurality of times of detection processing, where the following process is performed in each time of detection processing: performing transimpedance gain on the current signal based on a control signal, to obtain the voltage signal, and converting the voltage signal into the differential voltage signal; using a first frequency as a boundary, and separately detecting energy of the differential voltage signal that is higher than the first frequency and energy of the differential voltage signal that is lower than the first frequency, to obtain an energy difference, where the first frequency is 0.28/Tb, and Tb is duration of each bit of the differential voltage signal; and modifying the control signal based on a preset modification amount.

With reference to the third aspect, in a third possible implementation of the third aspect, after the converting, by the optical receiver, the voltage signal into a differential voltage signal, the method further includes: performing gain on the differential voltage signal based on a third control signal, where a frequency response value of the differential voltage signal within second bandwidth is greater than that within the first bandwidth, and any frequency in the second bandwidth is higher than any frequency in the first bandwidth; and after the generating a second control signal, the method further includes: generating a fourth control signal based on a differential voltage signal obtained after the gain, where the fourth control signal is used to control the optical receiver to perform gain on the differential voltage signal.

With reference to the third possible implementation of the third aspect, in a fourth possible implementation of the third aspect, the generating a second control signal based on the differential voltage signal specifically includes: performing a plurality of times of first sampling processing, and using, as the second control signal, a control signal corresponding to a sampling point with a maximum value in a plurality of sampling points obtained after the plurality of times of first sampling processing, where the following process is performed in each time of first sampling processing: performing transimpedance gain on the current signal based on a control signal, to obtain the voltage signal, and converting the voltage signal into the differential voltage signal; sampling an upper level and a lower level of the differential voltage signal, to obtain a value of a sampling point; and modifying the control signal based on a preset modification amount; and the generating a fourth control signal based on the differential voltage signal specifically includes: performing a plurality of times of second sampling processing, and using, as the fourth control signal, a control signal corresponding to a sampling point with a maximum value in a plurality of sampling points obtained after the plurality of times of second sampling processing, where the following process is performed in each time of second sampling processing: performing gain on the differential voltage signal based on a control signal, to obtain the differential voltage signal obtained after the gain; sampling an upper level and a lower level of the differential voltage signal obtained after the gain, to obtain a value of a sampling point; and modifying the control signal based on the preset modification amount.

With reference to the third possible implementation of the third aspect, in a fifth possible implementation of the third aspect, the generating a second control signal based on the differential voltage signal specifically includes: performing a plurality of times of first detection processing, and using, as the second control signal, a control signal corresponding to a minimum energy difference in a plurality of energy differences obtained after the plurality of times of first detection processing, where the following process is performed in each time of first detection processing: performing transimpedance gain on the current signal based on a control signal, to obtain the voltage signal, and converting the voltage signal into the differential voltage signal; sampling an upper level and a lower level of the differential voltage signal, to obtain a value of a sampling point; and modifying the control signal based on a preset modification amount; and the generating a fourth control signal based on the differential voltage signal specifically includes: performing a plurality of times of second detection processing, and using, as the fourth control signal, a control signal corresponding to a minimum energy difference in a plurality of energy differences obtained after the plurality of times of second sampling processing, where the following process is performed in each time of second detection processing: performing gain on the differential voltage signal based on a control signal, to obtain the differential voltage signal obtained after the gain; using a first frequency as a boundary, and separately detecting energy of the differential voltage signal that is higher than the first frequency and energy of the differential voltage signal that is lower than the first frequency, to obtain an energy difference, where the first frequency is 0.28/Tb, and Tb is duration of each bit of the differential voltage signal; and modifying the control signal based on the preset modification amount.

The embodiment in the third aspect is a receiving method corresponding to the optical receiver in the first aspect, beneficial effects are the same as those of the first aspect, and details are not described herein again.

According to a fourth aspect, a receiving method is provided, comprising: converting, by an optical receiver, a received optical signal into a current signal by using an optoelectronic detector, where bandwidth of the optoelectronic detector is lower than a system transmission bandwidth requirement; performing, by the optical receiver, transimpedance gain on the current signal, to obtain a voltage signal, and converting the voltage signal into a differential voltage signal; performing, by the optical receiver, gain on the differential voltage signal based on a first control signal, to obtain a differential voltage signal obtained after the gain, where a frequency response value of the differential voltage signal within first bandwidth is greater than that within the bandwidth of the optoelectronic detector, and any frequency in the first bandwidth is higher than an upper cut-off frequency of the optoelectronic detector; and generating, by the optical receiver, a second control signal based on the differential voltage signal obtained after the gain, where the second control signal is used to control the optical receiver to perform gain on the differential voltage signal.

With reference to the fourth aspect, in a first possible implementation of the fourth aspect, the generating a second control signal based on the differential voltage signal obtained after the gain specifically includes: performing a plurality of times of sampling processing, and using, as the second control signal, a control signal corresponding to a sampling point with a maximum value in a plurality of sampling points obtained after the plurality of times of sampling processing, where the following process is performed in each time of sampling processing: performing gain on the differential voltage signal based on a control signal, to obtain the differential voltage signal obtained after the gain; sampling an upper level and a lower level of the differential voltage signal obtained after the gain, to obtain a value of a sampling point; and modifying the control signal based on a preset modification amount.

With reference to the fourth aspect, in a second possible implementation of the fourth aspect, the generating a second control signal based on the differential voltage signal obtained after the gain specifically includes: performing a plurality of times of detection processing, and using, as the second control signal, a control signal corresponding to a minimum energy difference in a plurality of energy differences obtained after the plurality of times of detection processing, where the following process is performed in each time of detection processing: performing gain on the differential voltage signal based on a control signal, to obtain the differential voltage signal obtained after the gain; using a first frequency as a boundary, and separately detecting energy that is of the differential voltage signal obtained after the gain and that is higher than the first frequency and energy that is of the differential voltage signal obtained after the gain and that is lower than the first frequency, to obtain an energy difference, where the first frequency is 0.28/Tb, and Tb is duration of each bit of the differential voltage signal; and modifying the control signal based on a preset modification amount.

The embodiment in the fourth aspect is a receiving method corresponding to the optical receiver in the second aspect, beneficial effects are the same as those of the second aspect, and details are not described herein again.

According to a fifth aspect, a transimpedance amplification circuit is provided, including a fixed resistor, a first transistor, a second transistor, a variable resistance circuit, and an output port, where the fixed resistor includes two ports, where one port is grounded, and the other port is connected to an emitter of the first transistor; a base of the first transistor is configured to receive an input signal, and a collector of the first transistor is connected to an emitter of the second transistor; a base of the second transistor is configured to receive a bias voltage signal, and a collector of the second transistor is connected to a first port of the variable resistance circuit, where the bias voltage signal is used to adjust a gain for the input signal; the output port is located on a connecting line between the collector of the second transistor and the first port of the variable resistance circuit; and the variable resistance circuit includes three ports, where a second port of the variable resistance circuit is configured to receive a control signal, a third port of the variable resistance circuit is grounded, and the control signal is used to control a resistance value of the variable resistance circuit.

In conclusion, according to the optical receiver provided in the embodiments of this application, the optoelectronic detector whose bandwidth is lower than the system transmission bandwidth requirement is used, to greatly reduce costs of the optical receiver; and the transimpedance amplification circuit is used, to remedy received signal deterioration caused by bandwidth insufficiency, so that component costs are reduced while received signal quality is ensured.

DESCRIPTION OF EMBODIMENTS

The following describes the technical solutions in the embodiments of this application with reference to the accompanying drawings in the embodiments of this application.

Figure 1:
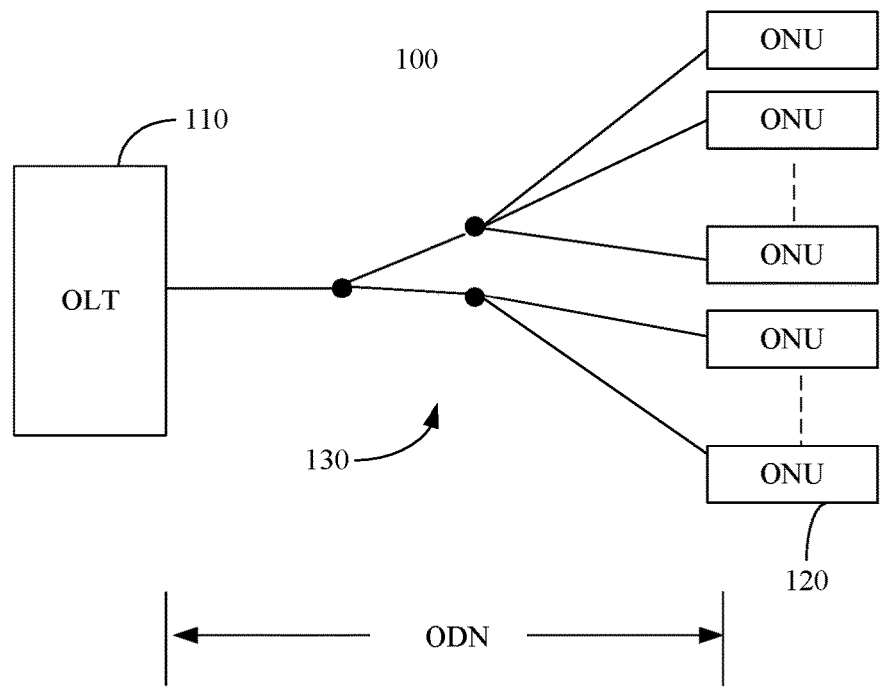
FIG. 1 is a schematic structural diagram of a 10G PON system.

Referring to FIG. 1, FIG. 1 is a schematic structural diagram of a 10G PON system to which an ONU or an Optical Line Terminal (OLT) that has an optical receiver provided in the embodiments of this application is applicable. A 10G PON system 100 includes at least one OLT 110, a plurality of ONUs 120, and one optical distribution network (ODN) 130. The OLT 110 is connected to the plurality of ONUs 120 by using the ODN 130 in a point-to-multipoint manner. A direction from the OLT 110 to the ONU 120 is defined as a downlink direction, and a direction from the ONU 120 to the OLT 110 is defined as an uplink direction.

Figure 2:
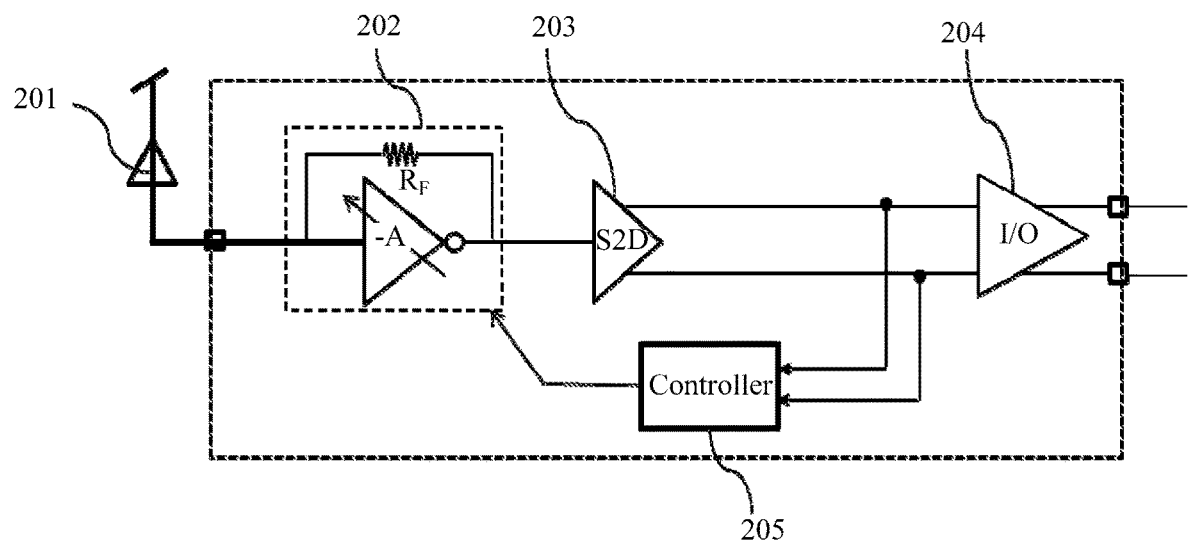
FIG. 2 is a schematic structural diagram of an optical receiver according to an embodiment of this application.

An embodiment of this application provides an optical receiver 200, and the optical receiver 200 may be applied to an ONU of a 10G PON system or a higher-rate PON system. As shown in FIG. 2, the optical receiver 200 includes an optoelectronic detector 201, a transimpedance amplification circuit 202, a single-ended-to-differential converter 203, an I/O interface 204, and a controller 205.

The optoelectronic detector 201 is configured to convert a received optical signal into a current signal, where bandwidth of the optoelectronic detector 201 is lower than a system transmission bandwidth requirement.

Specifically, the optoelectronic detector 201 accounts for a largest proportion of costs in the optical receiver 200, and therefore component costs can be greatly reduced by using the low-bandwidth optoelectronic detector 201. Correspondingly, there is a problem that a high-frequency signal cannot be detected.

The transimpedance amplification circuit 202 is configured to: receive the current signal and a first control signal, and perform transimpedance gain on the current signal based on the first control signal, to obtain a voltage signal, where a frequency response value of the current signal within first bandwidth is greater than that within the bandwidth of the optoelectronic detector 201, and any frequency in the first bandwidth is not lower than an upper cut-off frequency of the optoelectronic detector 201.

Optionally, the transimpedance amplification circuit 202 may be an underdamped transimpedance amplification circuit. This application provides a possible implementation. A structure of the underdamped transimpedance amplification circuit is shown in FIG. 3, and includes a fixed resistor 301, a first transistor 302, a second transistor 303, a variable resistance circuit 304, and an output port 305.

The fixed resistor 301 includes two ports. One port is grounded, and the other port is connected to an emitter of the first transistor 302. A base of the first transistor 302 is configured to receive an input signal, and a collector of the first transistor 302 is connected to an emitter of the second transistor 303. A base of the second transistor 303 is configured to receive a bias voltage signal, and a collector of the second transistor 303 is connected to a first port of the variable resistance circuit 304. The bias voltage signal is used to adjust a gain for the input signal. The output port 305 is located on a connecting line between the collector of the second transistor 303 and the first port of the variable resistance circuit 304. The variable resistance circuit 304 includes three ports. A second port of the variable resistance circuit 304 is configured to receive a control signal, a third port of the variable resistance circuit 304 is grounded, and the control signal is used to control a resistance value of the variable resistance circuit 304.

Figure 3:
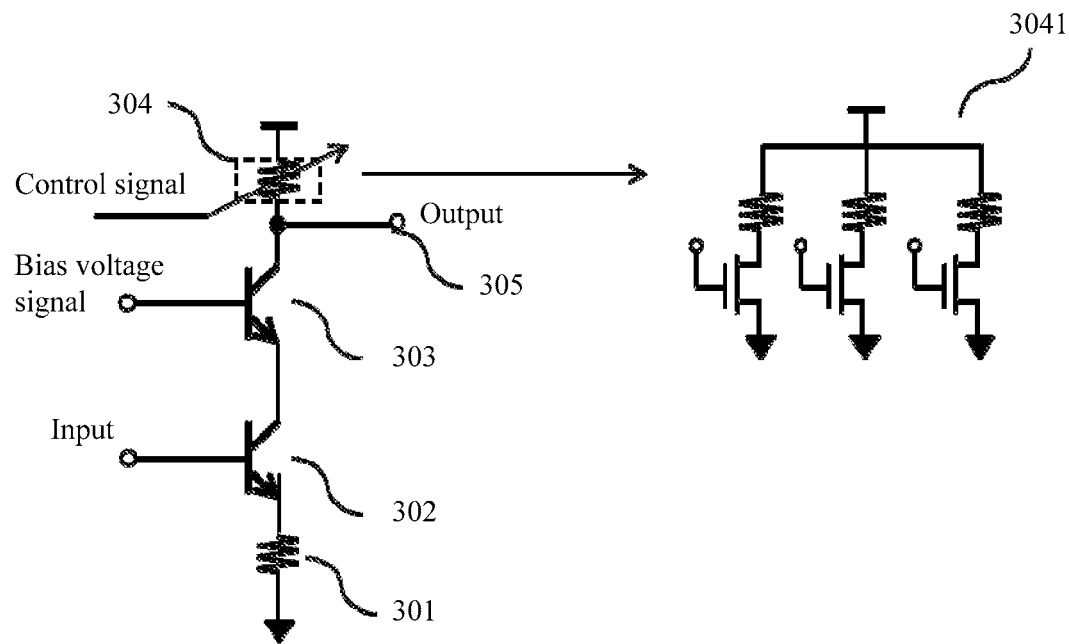
FIG. 3 is a schematic structural diagram of a transimpedance amplification circuit according to another embodiment of this application.

It should be understood that 3041 in FIG. 3 shows a specific implementation solution of the variable resistance circuit, and there are still many similar implementation solutions. This is not limited in this application.

Figure 4:
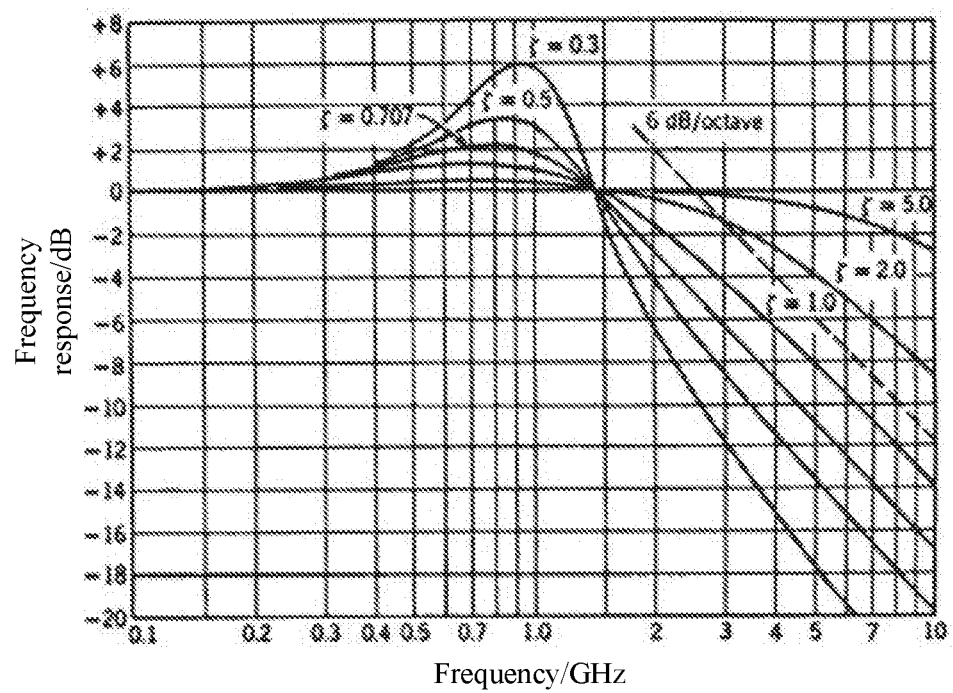
FIG. 4 is a diagram of a frequency response curve of a transimpedance amplification circuit according to another embodiment of this application.

In this embodiment of this application, the resistance value of the variable resistance circuit 304 is adjusted, to change a damping factor of the transimpedance amplification circuit 202. A smaller damping factor brings a greater additional gain for a high frequency. A frequency response curve of the transimpedance amplification circuit 202 is shown in FIG. 4, and in FIG. 4 is a damping factor. The high frequency herein is a frequency higher than the upper cut-off frequency of the optoelectronic detector 201.

Figure 5:
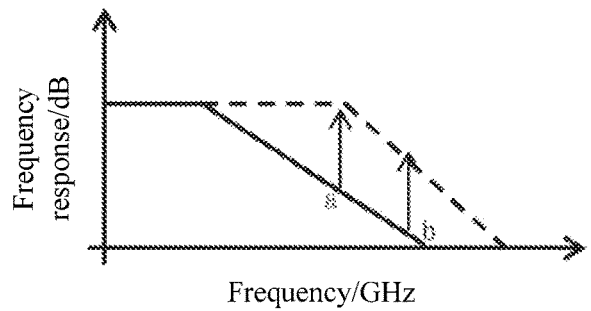
FIG. 5 is a schematic diagram of performing, by a transimpedance amplification circuit, gain compensation for a high frequency of an optoelectronic detector according to another embodiment of this application.

It should be noted that the first bandwidth of the transimpedance amplification circuit 202 may be controlled by using an existing technical solution. This is not limited in this application. In addition, the damping factor cannot be excessively small because a smaller damping factor causes severer system oscillation. Due to a value limitation of the damping factor, there is a value range of an additional gain for the high frequency by the transimpedance amplification circuit 202. As shown in FIG. 5, a solid line represents a frequency response curve of the optoelectronic detector 201, and a dashed line is a combined frequency response curve of the transimpedance amplification circuit 202 and the optoelectronic detector 201. For example, at a location a, a to-be-compensated difference does not exceed the range of the additional gain for the high frequency by the transimpedance amplification circuit 202, and therefore compensation may be performed by using the transimpedance amplification circuit 202; and at a location b, a to-be-compensated difference exceeds the range of the additional gain for the high frequency by the transimpedance amplification circuit 202, and therefore complete compensation cannot be implemented solely by using the transimpedance amplification circuit 202. In this case, next-order compensation is needed.

The single-ended-to-differential converter 203 is configured to: convert the voltage signal into a differential voltage signal, and send the differential voltage signal to the I/O interface 204 and the controller 205.

The I/O interface 204 is configured to output the differential voltage signal.

The controller 205 is configured to: generate a second control signal based on the differential voltage signal, and send the second control signal to the transimpedance amplification circuit 202, where the second control signal is used to control the transimpedance amplification circuit 202 to perform transimpedance gain on the current signal.

Specifically, a signal processing process of the optical receiver 200 is as follows:

An optical signal detected by the optical receiver 200 first passes through the optoelectronic detector 201 for optoelectronic detection, to generate a current signal, and the current signal is converted into a voltage signal after passing through the transimpedance amplification circuit 202. The transimpedance amplification circuit can provide a first-order high frequency gain, and the gain is implemented inside the transimpedance amplification circuit 202. As shown in FIG. 3, the resistance value of the variable resistance circuit 304 is adjusted, to generate a peak gain at a gain frequency to compensate for insufficiency of the bandwidth of the optoelectronic detector 201 (that is, provide a higher gain at a high frequency in a passband range of the transimpedance amplification circuit 202). Because the gain is implemented inside the transimpedance amplification circuit 202 without introducing additional noise, noise-free gain compensation can be implemented for the high frequency. The high frequency herein is also a frequency that is higher than the upper cut-off frequency of the optoelectronic detector 201.

The signal for which gain compensation is performed by the transimpedance amplification circuit 202 is converted into a differential signal by the single-ended-to-differential converter 203, and the differential signal is output by using the I/O interface 204.

Figure 6:
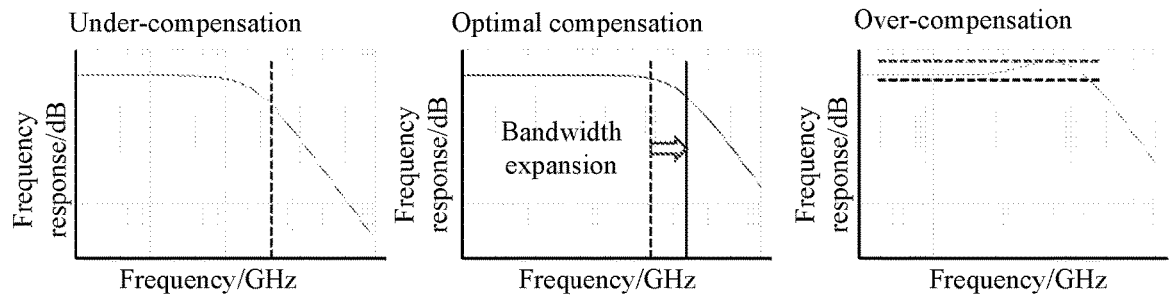
FIG. 6 is schematic diagrams of under-compensation, optimal compensation, and over-compensation.

Further, the controller 205 is configured to: adaptively generate the second control signal, and control the transimpedance amplification circuit 202 to perform transimpedance gain on the received current signal, to enable the transimpedance amplification circuit 202 to perform current-stage optimal compensation for the optoelectronic detector 201. Three compensation possibilities: under-compensation, optimal compensation, and over-compensation are shown in FIG. 6.

Optionally, the second control signal that enables the transimpedance amplification circuit 202 to perform the current-stage optimal compensation is mainly generated in the following two manners:

(1) The controller 205 performs a plurality of times of sampling processing, and performs the following process in each time of sampling processing:

First, the controller 205 sends a control signal to the transimpedance amplification circuit 202.

In this case, the transimpedance amplification circuit 202 generates, for the current signal, a transimpedance gain determined by the control signal, to obtain a voltage signal; and the voltage signal passes through the single-ended-to-differential converter 203, to obtain a differential voltage signal.

Then, the controller 205 samples an upper level and a lower level of the received differential voltage signal, to obtain a value of a sampling point.

Finally, the controller 205 modifies the control signal based on a preset modification amount.

In other words, each time of sampling processing is performed for a signal that is obtained after different transimpedance gain, to obtain a different sampling point. A sampling point with a maximum value is selected from obtained sampling points, and a control signal corresponding to the sampling point can enable the transimpedance amplification circuit 202 to perform the current-stage optimal compensation.

Therefore, after performing the plurality of times of sampling processing, the controller 205 is specifically configured to use, as the second control signal, the control signal corresponding to the sampling point with the maximum value in the plurality of sampling points obtained after the plurality of times of sampling processing.

(2) The controller 205 performs a plurality of times of detection processing, and performs the following process in each time of detection processing:

First, the controller 205 sends a control signal to the transimpedance amplification circuit 202.

In this case, the transimpedance amplification circuit 202 generates, for the current signal, a transimpedance gain determined by the control signal, to obtain a voltage signal; and the voltage signal passes through the single-ended-to-differential converter 203, to obtain a differential voltage signal.

Then, the controller 205 uses a first frequency as a boundary, and separately detects energy of the differential voltage signal that is higher than the first frequency and energy of the differential voltage signal that is lower than the first frequency, to obtain an energy difference, where the first frequency is 0.28/Tb, and Tb is duration of each bit of the received differential voltage signal.

Finally, the controller 205 modifies the control signal based on a preset modification amount.

In other words, each time of detection processing is performed for a signal that is obtained after different transimpedance gain, to obtain a different energy difference. A minimum energy difference is selected from obtained energy differences, and a control signal corresponding to the energy difference can enable the transimpedance amplification circuit 202 to perform the current-stage optimal compensation.

Therefore, after performing the plurality of times of detection processing, the controller 205 is specifically configured to use, as the second control signal, the control signal corresponding to the minimum energy difference in the plurality of energy differences obtained after the plurality of times of detection processing.

It should be understood that the second control signal may be selected at intervals. Because an execution time of the foregoing selection process is very short compared with an interval time, service transmission is not affected. In addition, a compensation effect of the transimpedance amplification circuit 202 varies with an environmental change, and the environmental change (such as a temperature change) is a gradual process. Therefore, a control signal used during current execution may be modified for several times only in a relatively small range, and an optimal control signal is selected by using one of the foregoing methods (1) and (2). In this way, the execution time of the selection process can be effectively reduced.

Figure 7:
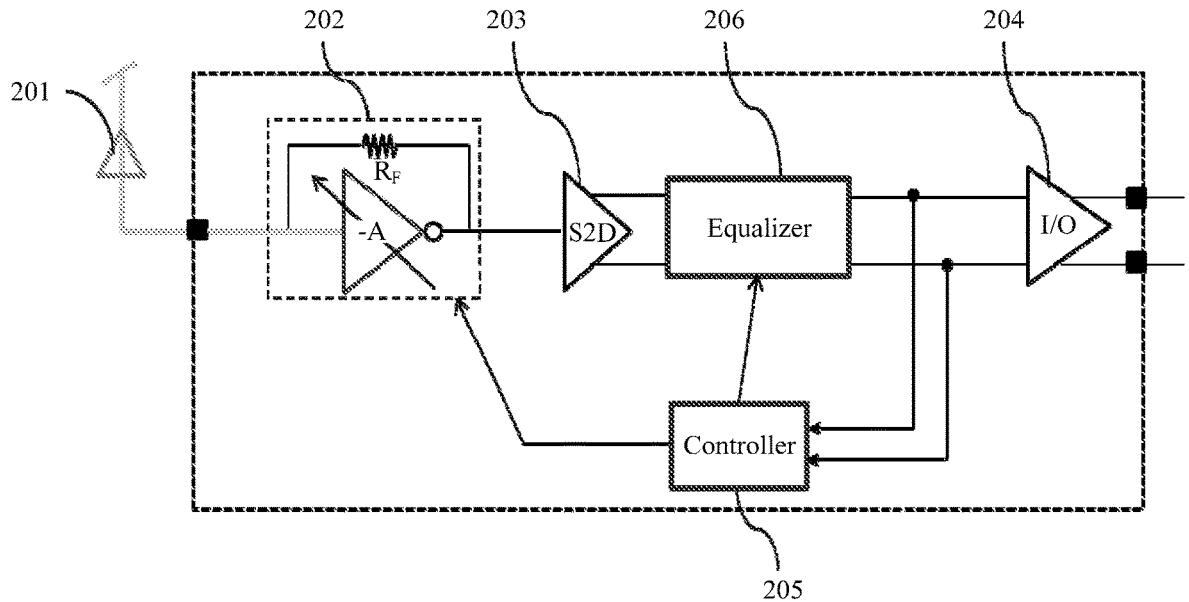
FIG. 7 is a schematic structural diagram of an optical receiver according to another embodiment of this application.

Optionally, the optical receiver 200 further includes an equalizer 206. As shown in FIG. 7, the equalizer 206 is configured to: receive the differential voltage signal and a third control signal, perform gain on the differential voltage signal based on the third control signal, and send a differential voltage signal obtained after the gain to the controller and the I/O interface, where a frequency response value of the differential voltage signal within second bandwidth is greater than that within the first bandwidth, and any frequency in the second bandwidth is higher than any frequency in the first bandwidth.

In this case, the controller 205 is further configured to: generate a fourth control signal based on the differential voltage signal, and send the fourth control signal to the equalizer 206, where the fourth control signal is used to control the equalizer 206 to perform gain on the differential voltage signal.

Specifically, in this embodiment of this application, the differential voltage signal output by the single-ended-to-differential converter 203 first passes through the equalizer 206. If gain compensation needs to be further optimized, the equalizer 206 performs further gain on the differential voltage signal; and if gain compensation is optimal, the equalizer 206 does not perform processing on the signal, and is equivalent to a transmission circuit.

Further, the controller 205 is configured to: adaptively generate the fourth control signal, and control the equalizer 206 to perform gain on the received differential voltage signal, to enable the equalizer 206 to perform optimal compensation for the optoelectronic detector 201. The equalizer 206 may be an analog equalizer or a digital equalizer.

Optionally, the second control signal that enables the transimpedance amplification circuit 202 to perform the optimal compensation and the fourth control signal that enables the equalizer 206 to perform the optimal compensation are mainly generated in the following two manners:

(1) The controller 205 performs a plurality of times of first sampling processing, and performs the following process in each time of first sampling processing:

sending, by the controller 205, a control signal to the transimpedance amplification circuit 202;

sampling, by the controller 205, an upper level and a lower level of the received differential voltage signal, to obtain a value of a sampling point; and modifying, by the controller 205, the control signal based on a preset modification amount.

After performing the plurality of times of first sampling processing, the controller 205 uses, as the second control signal, a control signal corresponding to a sampling point with a maximum value in a plurality of sampling points obtained after the plurality of times of first sampling processing.

After sending the second control signal to the transimpedance amplification circuit 202, the controller 205 further performs a plurality of times of second sampling processing, and performs the following process in each time of second sampling processing:

sending, by the controller 205, a control signal to the equalizer 206;

sampling, by the controller 205, an upper level and a lower level of the received differential voltage signal, to obtain a value of a sampling point; and modifying, by the controller 205, the control signal based on the preset modification amount.

After performing the plurality of times of second sampling processing, the controller 205 uses, as the fourth control signal, a control signal corresponding to a sampling point with a maximum value in a plurality of sampling points obtained after the plurality of times of second sampling processing.

(2) The controller 205 performs a plurality of times of first detection processing, and performs the following process in each time of first detection processing:

sending, by the controller 205, a control signal to the transimpedance amplification circuit 202;

using, by the controller 205, a first frequency as a boundary, and separately detecting energy of the differential voltage signal that is higher than the first frequency and energy of the differential voltage signal that is lower than the first frequency, to obtain an energy difference, where the first frequency is 0.28/Tb, and Tb is duration of each bit of the differential voltage signal;

and modifying, by the controller 205, the control signal based on a preset modification amount.

After performing the plurality of times of first detection processing, the controller 205 uses, as the second control signal, a control signal corresponding to a minimum energy difference in a plurality of energy differences obtained after the plurality of times of first detection processing.

After sending the second control signal to the transimpedance amplification circuit 202, the controller 205 further performs a plurality of times of second detection processing, and performs the following process in each time of second detection processing:

sending, by the controller 205, a control signal to the equalizer;

using, by the controller 205, the first frequency as a boundary, and separately detecting energy of the differential voltage signal that is higher than the first frequency and energy of the differential voltage signal that is lower than the first frequency, to obtain an energy difference, where the first frequency is 0.28/Tb, and Tb is duration of each bit of the differential voltage signal;

and modifying, by the controller 205, the control signal based on the preset modification amount.

After performing the plurality of times of second detection processing, the controller 205 uses, as the fourth control signal, a control signal corresponding to a minimum energy difference in a plurality of energy differences obtained after the plurality of times of second detection processing.

It should be noted that if the obtained value of the sampling point is maximum or the obtained energy difference is minimum when the equalizer 206 does not perform gain on the differential voltage signal, it indicates that the transimpedance amplification circuit 202 has already performed optimal compensation for the optoelectronic detector 201, and the equalizer 206 does not need to function; otherwise, it indicates that the equalizer 206 needs to function.

In addition, gain compensation by the transimpedance amplification circuit 202 is implemented inside the transimpedance amplification circuit 202 without introducing additional noise, but the equalizer 206 introduces additional noise during compensation. Therefore, the transimpedance amplification circuit 202 is adjusted preferentially. However, the equalizer 206 has an advantage of a wide compensation range, and can perform compensation for a higher frequency compared with the transimpedance amplification circuit 202. If the transimpedance amplification circuit 202 cannot implement optimal compensation, the equalizer 206 may perform further compensation, to achieve an optimal compensation effect.

Further, the second control signal and the fourth control signal may be selected at intervals. Because an execution time of the foregoing selection process is very short compared with an interval time, service transmission is not affected. In addition, compensation effects of the transimpedance amplification circuit 202 and the equalizer 206 vary with an environmental change, and the environmental change (such as a temperature change) is a gradual process. Therefore, only a control signal used during current execution may be modified for several times in a relatively small range, and an optimal control signal is selected by using one of the foregoing methods (1) and (2). In this way, the execution time of the selection process can be effectively reduced.

Figure 8:
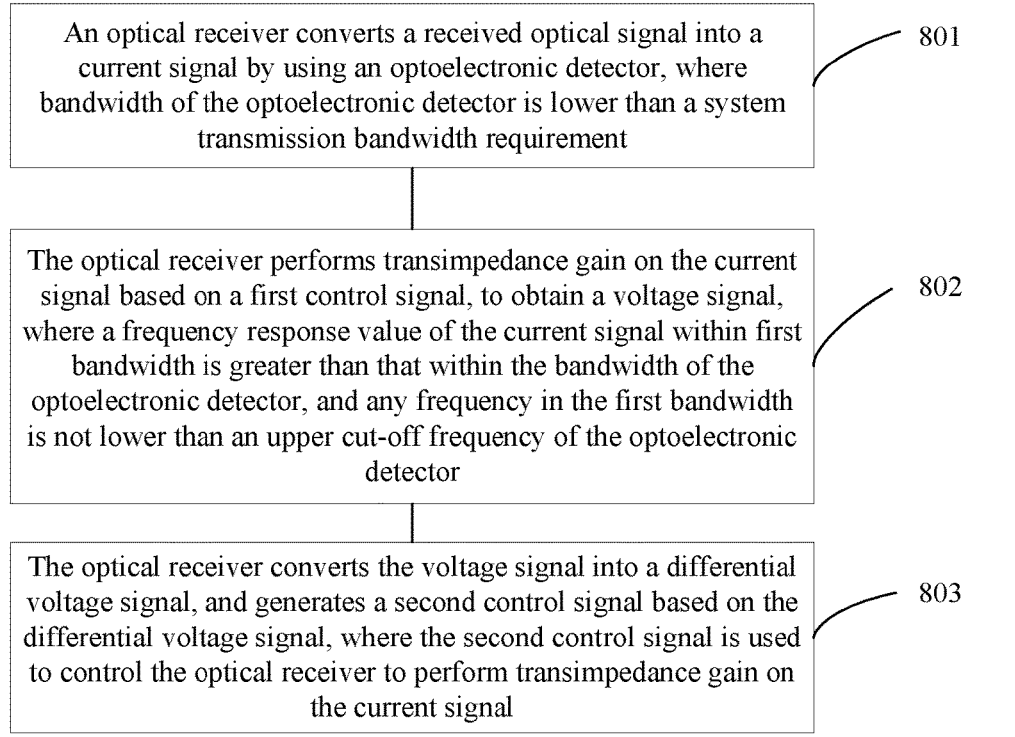
FIG. 8 is a flowchart of a receiving method according to another embodiment of this application.

Another embodiment of this application provides a receiving method. As shown in FIG. 8, the method includes the following steps:

801. An optical receiver converts a received optical signal into a current signal by using an optoelectronic detector, where bandwidth of the optoelectronic detector is lower than a system transmission bandwidth requirement.

802. The optical receiver performs transimpedance gain on the current signal based on a first control signal, to obtain a voltage signal, where a frequency response value of the current signal within first bandwidth is greater than that within the bandwidth of the optoelectronic detector, and any frequency in the first bandwidth is not lower than an upper cut-off frequency of the optoelectronic detector.

803. The optical receiver converts the voltage signal into a differential voltage signal, and generates a second control signal based on the differential voltage signal, where the second control signal is used to control the optical receiver to perform transimpedance gain on the current signal.

Optionally, solutions in which the optical receiver generates the second control signal based on the differential voltage signal are as follows:

(1) Perform a plurality of times of sampling processing, and use, as the second control signal, a control signal corresponding to a sampling point with a maximum value in a plurality of sampling points obtained after the plurality of times of sampling processing, where the following process is performed in each time of sampling processing:

performing transimpedance gain on the current signal based on a control signal, to obtain the voltage signal, and converting the voltage signal into the differential voltage signal; sampling an upper level and a lower level of the differential voltage signal, to obtain a value of a sampling point; and modifying the control signal based on a preset modification amount.

(2) Perform a plurality of times of detection processing, and use, as the second control signal, a control signal corresponding to a minimum energy difference in a plurality of energy differences obtained after the plurality of times of detection processing, where the following process is performed in each time of detection processing:

performing transimpedance gain on the current signal based on a control signal, to obtain the voltage signal, and converting the voltage signal into the differential voltage signal; using a first frequency as a boundary, and separately detecting energy of the differential voltage signal that is higher than the first frequency and energy of the differential voltage signal that is lower than the first frequency, to obtain an energy difference, where the first frequency is 0.28/Tb, and Tb is duration of each bit of the differential voltage signal; and modifying the control signal based on a preset modification amount.

In short, in both the foregoing two solutions, the control signal is modified, so that the received signal is in different statuses, and a relatively optimal control signal is selected by comparing these statuses.

Optionally, after the converting, by the optical receiver, the voltage signal into a differential voltage signal, the method further includes: performing gain on the differential voltage signal based on a third control signal, where a frequency response value of the differential voltage signal within second bandwidth is greater than that within the first bandwidth, and any frequency in the second bandwidth is higher than any frequency in the first bandwidth. After the generating a second control signal, the method further includes: generating a fourth control signal based on a differential voltage signal obtained after the gain, where the fourth control signal is used to control the optical receiver to perform gain on the differential voltage signal.

In this case, solutions in which the optical receiver generates the second control signal and the fourth control signal based on the differential voltage signal are as follows:

(1) Perform a plurality of times of first sampling processing, and use, as the second control signal, a control signal corresponding to a sampling point with a maximum value in a plurality of sampling points obtained after the plurality of times of first sampling processing, where the following process is performed in each time of first sampling processing:

performing transimpedance gain on the current signal based on a control signal, to obtain the voltage signal, and converting the voltage signal into the differential voltage signal; sampling an upper level and a lower level of the differential voltage signal, to obtain a value of a sampling point; and modifying the control signal based on a preset modification amount.

After generating the second control signal, the optical receiver performs a plurality of times of second sampling processing, and uses, as the fourth control signal, a control signal corresponding to a sampling point with a maximum value in a plurality of sampling points obtained after the plurality of times of second sampling processing, where the following process is performed in each time of second sampling processing:

performing gain on the differential voltage signal based on a control signal, to obtain the differential voltage signal obtained after the gain; sampling an upper level and a lower level of the differential voltage signal obtained after the gain, to obtain a value of a sampling point; and modifying the control signal based on the preset modification amount.

(2) Perform a plurality of times of first detection processing, and use, as the second control signal, a control signal corresponding to a minimum energy difference in a plurality of energy differences obtained after the plurality of times of first detection processing, where the following process is performed in each time of first detection processing:

performing transimpedance gain on the current signal based on a control signal, to obtain the voltage signal, and converting the voltage signal into the differential voltage signal; sampling an upper level and a lower level of the differential voltage signal, to obtain a value of a sampling point; and modifying the control signal based on a preset modification amount.

After generating the second control signal, the optical receiver performs a plurality of times of second detection processing, and uses, as the fourth control signal, a control signal corresponding to a minimum energy difference in a plurality of energy differences obtained after the plurality of times of second sampling processing, where the following process is performed in each time of second detection processing: performing gain on the differential voltage signal based on a control signal, to obtain the differential voltage signal obtained after the gain; using a first frequency as a boundary, and separately detecting energy of the differential voltage signal that is higher than the first frequency and energy of the differential voltage signal that is lower than the first frequency, to obtain an energy difference, where the first frequency is 0.28/Tb, and Tb is duration of each bit of the differential voltage signal; and modifying the control signal based on the preset modification amount.

This embodiment of this application is a method embodiment corresponding to the foregoing apparatus embodiment, implementation principles and achieved effects have been described in the foregoing embodiment, and details are not described in this embodiment of this application again.

Figure 9:
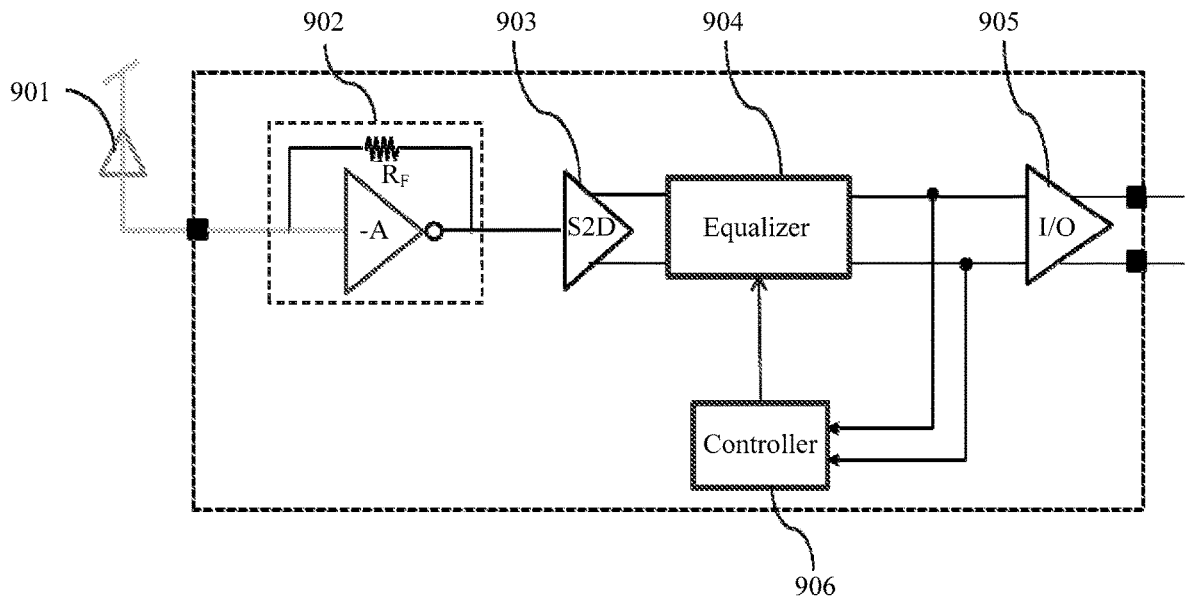
FIG. 9 is a schematic structural diagram of an optical receiver according to another embodiment of this application.

Another embodiment of this application provides an optical receiver 900, and the optical receiver 900 may be applied to an ONU of a 10G PON system or a higher-rate PON system. As shown in FIG. 9, the optical receiver 900 includes an optoelectronic detector 901, a first transimpedance amplification circuit 902, a single-ended-to-differential converter 903, an equalizer 904, an I/O interface 905, and a controller 906.

The optoelectronic detector 901 is configured to convert a received optical signal into a current signal, where bandwidth of the optoelectronic detector 901 is lower than a system transmission bandwidth requirement.

Specifically, the optoelectronic detector 901 accounts for a largest proportion of costs in the optical receiver 900, and therefore component costs can be greatly reduced by using the low-bandwidth optoelectronic detector 901. Correspondingly, there is a problem that a high-frequency signal cannot be detected.

The first transimpedance amplification circuit 902 is configured to: receive the current signal, and perform transimpedance gain on the current signal, to obtain a voltage signal.

The single-ended-to-differential converter 903 is configured to: convert the voltage signal into a differential voltage signal, and send the differential voltage signal to the equalizer 904.

The equalizer 904 is configured to: receive the differential voltage signal and a first control signal, perform gain on the differential voltage signal based on the first control signal, and send a differential voltage signal obtained after the gain to the I/O interface 905 and the controller 906, where a frequency response value of the differential voltage signal within first bandwidth is greater than that within the bandwidth of the optoelectronic detector 901, and any frequency in the first bandwidth is higher than an upper cut-off frequency of the optoelectronic detector 901.

The equalizer 904 herein may be an analog equalizer or a digital equalizer.

The I/O interface 905 is configured to output the differential voltage signal obtained after the gain.

The controller 906 is configured to: generate a second control signal based on the differential voltage signal obtained after the gain, and send the second control signal to the equalizer 904, where the second control signal is used to control the equalizer 904 to perform gain on the differential voltage signal.

In this embodiment of this application, the equalizer 904 is used to implement gain compensation for a high frequency. According to a feature of a wide compensation range of the equalizer 904, the equalizer 904 is enabled to perform compensation for the optoelectronic detector 901, to achieve an optimal effect. Compared with the previous embodiment without the equalizer, this embodiment has an advantage of a wider range of compensation for the optoelectronic detector 901, and has a disadvantage that more noise is introduced because gain compensation for the high frequency is completely implemented by the equalizer.

Optionally, the second control signal that enables the equalizer 904 to perform current-stage optimal compensation for the optoelectronic detector 901 is mainly generated in the following two manners:

(1) The controller 906 performs a plurality of times of sampling processing, and performs the following process in each time of sampling processing:

First, the controller 906 sends a control signal to the equalizer 904.

In this case, the equalizer 904 generates, for the differential voltage signal, a gain determined by the control signal, to obtain the differential voltage signal obtained after the gain.

Then, the controller 906 samples an upper level and a lower level of the differential voltage signal obtained after the gain, to obtain a value of a sampling point.

Finally, the controller 906 modifies the control signal based on a preset modification amount.

In other words, each time of sampling processing is performed for a signal that is obtained after different gain, to obtain a different sampling point. A sampling point with a maximum value is selected from obtained sampling points, and a control signal corresponding to the sampling point can enable the equalizer 904 to perform optimal compensation.

Therefore, after performing the plurality of times of sampling processing, the controller 906 is specifically configured to use, as the second control signal, the control signal corresponding to the sampling point with the maximum value in the plurality of sampling points obtained after the plurality of times of sampling processing.

(2) The controller 906 performs a plurality of times of detection processing, and performs the following process in each time of detection processing:

First, the controller 906 sends a control signal to the equalizer 904.

In this case, the equalizer 904 generates, for the differential voltage signal, a gain determined by the control signal, to obtain the differential voltage signal obtained after the gain.

Then, the controller 906 uses a first frequency as a boundary, and separately detects energy of the differential voltage signal that is higher than the first frequency and energy of the differential voltage signal that is lower than the first frequency, to obtain an energy difference, where the first frequency is 0.28/Tb, and Tb is duration of each bit of the differential voltage signal.

Finally, the controller 906 modifies the control signal based on a preset modification amount.

In other words, each time of detection processing is performed for a signal that is obtained after different gain, to obtain a different energy difference. A minimum energy difference is selected from obtained energy differences, and a control signal corresponding to the energy difference can enable the equalizer 904 to perform optimal compensation.

Therefore, after performing the plurality of times of detection processing, the controller 906 is specifically configured to use, as the second control signal, the control signal corresponding to the minimum energy difference in the plurality of energy differences obtained after the plurality of times of detection processing.

Figure 10:
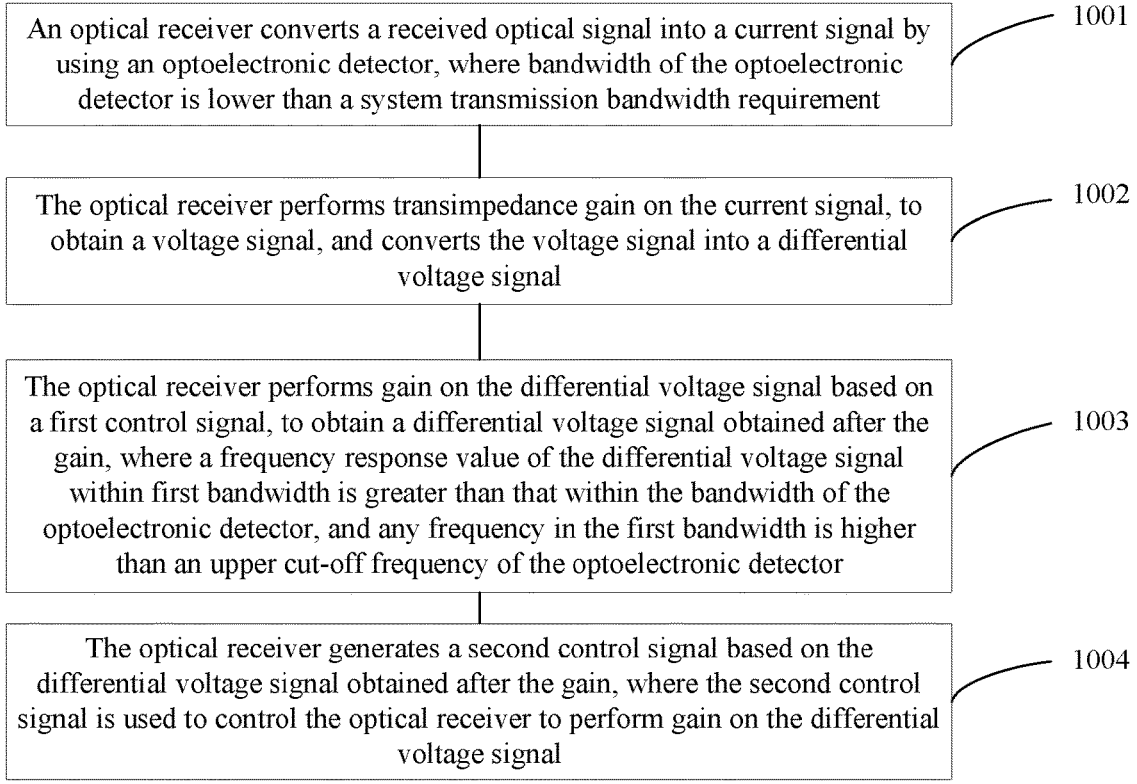
FIG. 10 is a flowchart of a receiving method according to another embodiment of this application.

Another embodiment of this application provides a receiving method. As shown in FIG. 10, the method includes the following steps:

1001. An optical receiver converts a received optical signal into a current signal by using an optoelectronic detector, where bandwidth of the optoelectronic detector is lower than a system transmission bandwidth requirement.

1002. The optical receiver performs transimpedance gain on the current signal, to obtain a voltage signal, and converts the voltage signal into a differential voltage signal.

1003. The optical receiver performs gain on the differential voltage signal based on a first control signal, to obtain a differential voltage signal obtained after the gain, where a frequency response value of the differential voltage signal within first bandwidth is greater than that within the bandwidth of the optoelectronic detector, and any frequency in the first bandwidth is higher than an upper cut-off frequency of the optoelectronic detector.

1004. The optical receiver generates a second control signal based on the differential voltage signal obtained after the gain, where the second control signal is used to control the optical receiver to perform gain on the differential voltage signal.

Optionally, generating a control signal with a relatively best compensation effect based on the differential voltage signal obtained after the gain is mainly performed in the following two methods:

(1) Perform a plurality of times of sampling processing, and use, as the second control signal, a control signal corresponding to a sampling point with a maximum value in a plurality of sampling points obtained after the plurality of times of sampling processing, where the following process is performed in each time of sampling processing:

performing gain on the differential voltage signal based on a control signal, to obtain the differential voltage signal obtained after the gain; sampling an upper level and a lower level of the differential voltage signal obtained after the gain, to obtain a value of a sampling point; and modifying the control signal based on a preset modification amount.

(2) Perform a plurality of times of detection processing, and use, as the second control signal, a control signal corresponding to a minimum energy difference in a plurality of energy differences obtained after the plurality of times of detection processing, where the following process is performed in each time of detection processing:

performing gain on the differential voltage signal based on a control signal, to obtain the differential voltage signal obtained after the gain; using a first frequency as a boundary, and separately detecting energy that is of the differential voltage signal obtained after the gain and that is higher than the first frequency and energy that is of the differential voltage signal obtained after the gain and that is lower than the first frequency, to obtain an energy difference, where the first frequency is 0.28/Tb, and Tb is duration of each bit of the differential voltage signal; and modifying the control signal based on a preset modification amount.

The control methods in the foregoing plurality of embodiments are all adaptive feedback control manners. This application provides a plurality of possible implementations, and any similar control solution shall fall within the protection scope of this application.

Figure 11:
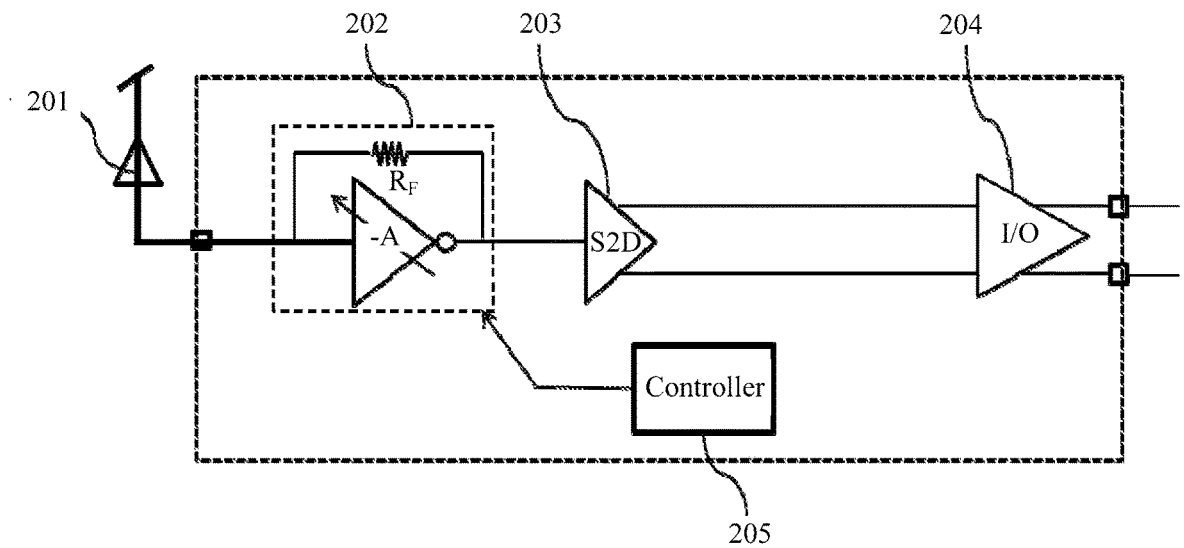
FIG. 11 is a schematic structural diagram of an optical receiver according to another embodiment of this application.

Further, in addition to the adaptive feedback control manners, equalization adjustment may further be controlled and implemented in a programmable analog or digital manner. An optical receiver in this solution may include components similar to those included in any optical receiver shown in FIG. 2, FIG. 7, or FIG. 9. Functions of an optoelectronic detector, a transimpedance amplification circuit, a single-ended-to-differential converter, an equalizer, and an I/O interface are all the same as those in the foregoing embodiments, and an only difference lies in that a controller does not need to receive a differential voltage signal, and therefore does not perform sampling processing or detection processing on the differential voltage signal. A correspondence between an external environmental change and a control signal, such as a relationship between a temperature and a control signal, is estimated based on related information such as a simulation result in a product design stage, and a corresponding control signal is directly selected based on an external temperature value. For reference, FIG. 11 is a schematic structural diagram of an optical receiver including components the same as those included in the optical receiver shown in FIG. 2.

It should be understood that the relationship between an external environmental change and a control signal may be pre-stored inside the controller; or may be stored in another driving component, where the driving component controls the controller to work; or may be printed, where operating personnel control, based on the correspondence, the controller to work. This is not limited in this application.

According to the optical receiver provided in the plurality of embodiments of this application, the optoelectronic detector whose bandwidth is lower than the system transmission bandwidth requirement is used, to greatly reduce costs of the optical receiver; and the transimpedance amplification circuit and/or the equalizer are/is used, to remedy received signal deterioration caused by bandwidth insufficiency, so that component costs are reduced while received signal quality is ensured.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical receiver, comprising an optoelectronic detector, a transimpedance amplification circuit, a single-ended-to-differential converter, an I/O interface, and a controller, wherein:

the optoelectronic detector is configured to convert a received optical signal into a current signal, wherein bandwidth of the optoelectronic detector is lower than a system transmission bandwidth requirement;

the transimpedance amplification circuit is configured to:
receive the current signal and a first control signal; and
perform transimpedance gain compensation for the current signal based on the first control signal to obtain a voltage signal, wherein a frequency response value of the current signal within first bandwidth is greater than that within the bandwidth of the optoelectronic detector, and wherein any frequency in the first bandwidth is not lower than an upper cut-off frequency of the optoelectronic detector;

the single-ended-to-differential converter is configured to:
convert the voltage signal into a differential voltage signal; and
send the differential voltage signal to the I/O interface and the controller;

the I/O interface is configured to output the differential voltage signal; and the controller is configured to:
generate the first control signal based on the differential voltage signal; and
send the first control signal to the transimpedance amplification circuit.

2. The optical receiver according to claim 1, wherein the controller is configured to perform a plurality of sampling processing and perform the following process in each time of sampling processing:

sending a control signal to the transimpedance amplification circuit;

sampling an upper level and a lower level of the received differential voltage signal to obtain a value of a sampling point; and modifying the control signal based on a preset modification amount; and wherein after performing the plurality of sampling processing, the controller is configured to:
use, as the first control signal, a control signal corresponding to a sampling point with a maximum value in a plurality of sampling points obtained after the plurality of sampling processing.

3. The optical receiver according to claim 1, wherein the controller is configured to perform a plurality of detection processing and perform the following process in each time of detection processing:
sending a control signal to the transimpedance amplification circuit;
using a first frequency as a boundary, and separately detecting energy of the differential voltage signal that is higher than the first frequency and energy of the differential voltage signal that is lower than the first frequency to obtain an energy difference, wherein the first frequency is $0.28/Tb$, and wherein Tb is duration of each bit of the differential voltage signal; and
modifying the control signal based on a preset modification amount; and
wherein after performing the plurality of detection processing, the controller is configured to:
use, as the first control signal, a control signal corresponding to a minimum energy difference in a plurality of energy differences obtained after the plurality of detection processing.

4. The optical receiver according to claim 1, wherein the optical receiver further comprises an equalizer, wherein:
the equalizer is configured to:
receive the differential voltage signal and a third control signal;
perform gain on the differential voltage signal based on the third control signal; and
send a differential voltage signal obtained after the gain to the controller and the I/O interface, wherein a frequency response value of the differential voltage signal within second bandwidth is greater than that within the first bandwidth, and wherein any frequency in the second bandwidth is higher than any frequency in the first bandwidth; and
the controller is further configured to:
generate a third control signal based on the differential voltage signal; and
send the third control signal to the equalizer.

5. The optical receiver according to claim 4, wherein the controller is configured to perform a plurality of first sampling processing and perform the following process in each time of first sampling processing:
sending a control signal to the transimpedance amplification circuit;
sampling an upper level and a lower level of the received differential voltage signal to obtain a value of a sampling point; and
modifying the control signal based on a preset modification amount;
wherein after performing the plurality of first sampling processing, the controller is configured to:
use, as the first control signal, a control signal corresponding to a sampling point with a maximum value in a plurality of sampling points obtained after the plurality of first sampling processing;
wherein after sending the first control signal to the transimpedance amplification circuit, the controller further performs a plurality of second sampling processing and performs the following process in each time of second sampling processing:
sending a control signal to the equalizer;
sampling an upper level and a lower level of the received differential voltage signal to obtain a value of a sampling point; and
modifying the control signal based on the preset modification amount; and
wherein after performing the plurality of second sampling processing, the controller is configured to:
use, as the third control signal, a control signal corresponding to a sampling point with a maximum value in a plurality of sampling points obtained after the plurality of second sampling processing.

6. The optical receiver according to claim 4, wherein the controller is configured to perform a plurality of first detection processing and perform the following process in each time of first detection processing:
sending a control signal to the transimpedance amplification circuit;
using a first frequency as a boundary, and separately detecting energy of the differential voltage signal that is higher than the first frequency and energy of the differential voltage signal that is lower than the first frequency to obtain an energy difference, wherein the first frequency is $0.28/Tb$, and wherein Tb is duration of each bit of the differential voltage signal; and
modifying the control signal based on a preset modification amount;
wherein after performing the plurality of first detection processing, the controller is configured to:
use, as the first control signal, a control signal corresponding to a minimum energy difference in a plurality of energy differences obtained after the plurality of first detection processing;
wherein after sending the first control signal to the transimpedance amplification circuit, the controller further performs a plurality of second detection processing and performs the following process in each time of second detection processing:
sending a control signal to the equalizer;
using the first frequency as a boundary, and separately detecting energy of the differential voltage signal that is higher than the first frequency and energy of the differential voltage signal that is lower than the first frequency to obtain an energy difference, wherein the first frequency is $0.28/Tb$, and wherein Tb is duration of each bit of the differential voltage signal; and
modifying the control signal based on the preset modification amount; and
wherein after performing the plurality of second detection processing, the controller is configured to:
use, as the third control signal, a control signal corresponding to a minimum energy difference in a plurality of energy differences obtained after the plurality of second detection processing.

7. The optical receiver according to claim 1, wherein the transimpedance amplification circuit comprises a fixed resistor, a first transistor, a second transistor, a variable resistance circuit, and an output port, and wherein:
the fixed resistor comprises two ports, wherein one port is grounded and the other port is connected to an emitter of the first transistor;
a base of the first transistor is configured to receive an input signal, and a collector of the first transistor is connected to an emitter of the second transistor;
a base of the second transistor is configured to receive a bias voltage signal, and a collector of the second transistor is connected to a first port of the variable resistance circuit, wherein the bias voltage signal is used to adjust a gain for the input signal;

the output port is located on a connecting line between the collector of the second transistor and the first port of the variable resistance circuit; and the variable resistance circuit comprises three ports, wherein a second port of the variable resistance circuit is configured to receive a control signal, wherein a third port of the variable resistance circuit is grounded, and wherein the control signal is used to control a resistance value of the variable resistance circuit.

8. An optical receiver, comprising an optoelectronic detector, a first transimpedance amplification circuit, a single-ended-to-differential converter, an equalizer, an I/O interface, and a controller, wherein:

the optoelectronic detector is configured to:
convert a received optical signal into a current signal, wherein bandwidth of the optoelectronic detector is lower than a system transmission bandwidth requirement;

the first transimpedance amplification circuit is configured to:
receive the current signal; and
perform transimpedance gain on the current signal to obtain a voltage signal;

the single-ended-to-differential converter is configured to:
convert the voltage signal into a differential voltage signal; and
send the differential voltage signal to the equalizer;

the equalizer is configured to:
receive the differential voltage signal and a first control signal;
perform gain on the differential voltage signal based on the first control signal; and
send a differential voltage signal obtained after the gain to the I/O interface and the controller, wherein a frequency response value of the differential voltage signal within first bandwidth is greater than that within the bandwidth of the optoelectronic detector, and wherein any frequency in the first bandwidth is higher than an upper cut-off frequency of the optoelectronic detector;

the I/O interface is configured to output the differential voltage signal obtained after the gain; and the controller is configured to:
generate the first control signal based on the differential voltage signal obtained after the gain; and
send the first control signal to the equalizer.

9. The optical receiver according to claim 8, wherein the controller is configured to perform a plurality of sampling processing and perform the following process in each time of sampling processing:

sending a control signal to the equalizer;
sampling an upper level and a lower level of the received differential voltage signal to obtain a value of a sampling point; and
modifying the control signal based on a preset modification amount; and
wherein after performing the plurality of sampling processing, the controller is configured to use, as the first control signal, a control signal corresponding to a sampling point with a maximum value in a plurality of sampling points obtained after the plurality of sampling processing.

10. The optical receiver according to claim 8, wherein the controller is configured to perform a plurality of detection processing and perform the following process in each time of detection processing:

sending a control signal to the equalizer;
using a first frequency as a boundary, and separately detecting energy of the differential voltage signal that is higher than the first frequency and energy of the differential voltage signal that is lower than the first frequency to obtain an energy difference, wherein the first frequency is 0.28/Tb, and wherein Tb is duration of each bit of the differential voltage signal; and
modifying the control signal based on a preset modification amount; and
wherein after performing the plurality of detection processing, the controller is configured to use, as the first control signal, a control signal corresponding to a minimum energy difference in a plurality of energy differences obtained after the plurality of detection processing.

11. A receiving method, comprising:
converting, by an optical receiver, a received optical signal into a current signal by using an optoelectronic detector, wherein bandwidth of the optoelectronic detector is lower than a system transmission bandwidth requirement;
performing, by the optical receiver, transimpedance gain on the current signal based on a first control signal to obtain a voltage signal, wherein a frequency response value of the current signal within first bandwidth is greater than that within the bandwidth of the optoelectronic detector, and wherein any frequency in the first bandwidth is not lower than an upper cut-off frequency of the optoelectronic detector;
converting, by the optical receiver, the voltage signal into a differential voltage signal; and
generating the first control signal based on the differential voltage signal.

12. The method according to claim 11, wherein generating the first control signal based on the differential voltage signal comprises:
performing a plurality of sampling processing, and using, as the first control signal, a control signal corresponding to a sampling point with a maximum value in a plurality of sampling points obtained after the plurality of sampling processing, wherein the following process is performed in each time of sampling processing:
performing transimpedance gain on the current signal based on a control signal to obtain the voltage signal, and converting the voltage signal into the differential voltage signal;
sampling an upper level and a lower level of the differential voltage signal to obtain a value of a sampling point; and
modifying the control signal based on a preset modification amount.

13. The method according to claim 11, wherein generating the first control signal based on the differential voltage signal comprises:
performing a plurality of detection processing, and using, as the first control signal, a control signal corresponding to a minimum energy difference in a plurality of energy differences obtained after the plurality of detection processing, wherein the following process is performed in each time of detection processing:

performing transimpedance gain on the current signal based on a control signal to obtain the voltage signal, and converting the voltage signal into the differential voltage signal;

using a first frequency as a boundary, and separately detecting energy of the differential voltage signal that is higher than the first frequency and energy of the differential voltage signal that is lower than the first frequency to obtain an energy difference, wherein the first frequency is 0.28/Tb, and wherein Tb is duration of each bit of the differential voltage signal; and modifying the control signal based on a preset modification amount.

14. The method according to claim 11, wherein:

after converting, by the optical receiver, the voltage signal into the differential voltage signal, the method further comprises performing gain on the differential voltage signal based on a third control signal, wherein a frequency response value of the differential voltage signal within second bandwidth is greater than that within the first bandwidth, and wherein any frequency in the second bandwidth is higher than any frequency in the first bandwidth; and after generating the first control signal, the method further comprises generating the third control signal based on a differential voltage signal obtained after the gain.

15. The method according to claim 14, wherein generating the first control signal based on the differential voltage signal comprises:

performing a plurality of first sampling processing, and using, as the first control signal, a control signal corresponding to a sampling point with a maximum value in a plurality of sampling points obtained after the plurality of first sampling processing, wherein the following process is performed in each time of first sampling processing:

performing transimpedance gain on the current signal based on a control signal to obtain the voltage signal, and converting the voltage signal into the differential voltage signal;

sampling an upper level and a lower level of the differential voltage signal to obtain a value of a sampling point; and modifying the control signal based on a preset modification amount; and wherein generating the third control signal based on the differential voltage signal comprises:

performing a plurality of second sampling processing, and using, as the third control signal, a control signal corresponding to a sampling point with a maximum value in a plurality of sampling points obtained after the plurality of second sampling processing, wherein the following process is performed in each second sampling processing:

performing gain on the differential voltage signal based on a control signal to obtain the differential voltage signal obtained after the gain;

sampling an upper level and a lower level of the differential voltage signal obtained after the gain to obtain a value of a sampling point; and modifying the control signal based on the preset modification amount.

16. The method according to claim 14, wherein generating the first control signal based on the differential voltage signal comprises:

performing a plurality of first detection processing, and using, as the first control signal, a control signal corresponding to a minimum energy difference in a plurality of energy differences obtained after the plurality of first detection processing, wherein the following process is performed in each time of first detection processing:

performing transimpedance gain on the current signal based on a control signal to obtain the voltage signal, and converting the voltage signal into the differential voltage signal;

using a first frequency as a boundary, and separately detecting energy of the differential voltage signal that is higher than the first frequency and energy of the differential voltage signal that is lower than the first frequency to obtain an energy difference, wherein the first frequency is 0.28/Tb, and wherein Tb is duration of each bit of the differential voltage signal; and modifying the control signal based on a preset modification amount; and wherein generating the third control signal based on the differential voltage signal comprises:

performing a plurality of second detection processing, and using, as the third control signal, a control signal corresponding to a minimum energy difference in a plurality of energy differences obtained after the plurality of second detection processing, wherein the following process is performed in each time of second detection processing:

performing gain on the differential voltage signal based on a control signal to obtain the differential voltage signal obtained after the gain;

using the first frequency as a boundary, and separately detecting energy of the differential voltage signal that is higher than the first frequency and energy of the differential voltage signal that is lower than the first frequency, to obtain an energy difference, wherein the first frequency is 0.28/Tb, and wherein Tb is duration of each bit of the differential voltage signal; and modifying the control signal based on the preset modification amount.

\* \* \* \* \*

UNITED STATES PATENT AND TRADEMARK OFFICE
CERTIFICATE OF CORRECTION

PATENT NO. : 10,887,677 B2
APPLICATION NO. : 16/520029
DATED : January 5, 2021
INVENTOR(S) : Shengmeng Fu et al.

Page 1 of 1

It is certified that error appears in the above-identified patent and that said Letters Patent is hereby corrected as shown below:

In the Claims

In Column 25, Line 54, in Claim 15, after "each" insert -- time of --.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*